United States Patent
Xu et al.

(10) Patent No.: US 10,578,863 B2
(45) Date of Patent: Mar. 3, 2020

(54) HEADS UP DISPLAY, HEADS UP DISPLAY METHOD, AND TRAVELING APPARATUS

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Yuanjie Xu, Beijing (CN); Weiyun Huang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 25 days.

(21) Appl. No.: 15/743,401

(22) PCT Filed: Jun. 29, 2017

(86) PCT No.: PCT/CN2017/090701
§ 371 (c)(1),
(2) Date: Jan. 10, 2018

(87) PCT Pub. No.: WO2018/001291
PCT Pub. Date: Jan. 4, 2018

(65) Prior Publication Data
US 2018/0203227 A1    Jul. 19, 2018

(30) Foreign Application Priority Data

Jun. 30, 2016 (CN) .......................... 2016 1 0513705

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G01J 3/462* (2013.01);
(Continued)

(58) Field of Classification Search
CPC .. G02B 27/01–0198; G02B 2027/0118; G02B 2027/011–198; H04N 9/3182; G06T 7/90; G06T 19/20
See application file for complete search history.

(56) References Cited

U.S. PATENT DOCUMENTS

2004/0193331 A1* 9/2004 Kashiwada ............ G02B 27/01
701/1
2014/0132484 A1* 5/2014 Pandey .............. G02B 27/0172
345/8

(Continued)

FOREIGN PATENT DOCUMENTS

CN      1706697 A    12/2005
CN    103561223 A     2/2014

(Continued)

OTHER PUBLICATIONS

International search report dated Aug. 30, 2017 for corresponding application No. PCT/CN2017/090701 with English translation attached.

(Continued)

*Primary Examiner* — Cara E Rakowski
*Assistant Examiner* — Christopher A Lamb, II
(74) *Attorney, Agent, or Firm* — Nath, Goldberg & Meyer; Joshua B. Goldberg

(57) ABSTRACT

The present disclosure provides a heads up display, comprising: a projector, which is configured to project light to a preset region to form a projected image; an environment color acquisition device, which is configured to acquire an environment color of a background region corresponding to the preset region, wherein the background region is an (Continued)

external region observable through the preset region from an observer's position; and a controller, comprising a color control unit, the color control unit being configured to control a color of light projected by the projector according to the environment color, such that a color of the projected image and the environment color are distinguished from each other. Accordingly, the present disclosure further provides a heads up display method and a traveling apparatus. The present disclosure can enable a driver to always see displayed image clearly in various environments.

9 Claims, 3 Drawing Sheets

(51) Int. Cl.
H04N 9/31 (2006.01)
G01J 3/50 (2006.01)
G01J 3/52 (2006.01)
G01J 3/46 (2006.01)

(52) U.S. Cl.
CPC .............. G01J 3/50 (2013.01); G01J 3/528 (2013.01); H04N 9/315 (2013.01); H04N 9/3182 (2013.01); H04N 9/3194 (2013.01); B60K 2370/1529 (2019.05); B60K 2370/188 (2019.05); B60K 2370/334 (2019.05); B60K 2370/37 (2019.05); G02B 2027/014 (2013.01); G02B 2027/0118 (2013.01); G02B 2027/0138 (2013.01); G02B 2027/0196 (2013.01)

(56) References Cited

U.S. PATENT DOCUMENTS

| 2014/0253579 | A1* | 9/2014 | Babaguchi | G02B 27/01 345/590 |
| 2014/0293245 | A1* | 10/2014 | Tani | G03B 21/2053 353/85 |
| 2014/0293433 | A1 | 10/2014 | Hashimoto | |

FOREIGN PATENT DOCUMENTS

| CN | 103777438 A | 5/2014 |
| CN | 105657267 A | 6/2016 |
| CN | 106101667 A | 11/2016 |
| EP | 2784572 A1 | 10/2014 |
| KR | 1020150042478 A | 4/2015 |
| KR | 1020150094381 A | 8/2015 |

OTHER PUBLICATIONS

Chinese office action dated Jul. 17, 2017 for corresponding CN application 201610513705.2 with English translation attached.

* cited by examiner

HEADS UP DISPLAY, HEADS UP DISPLAY METHOD, AND TRAVELING APPARATUS

CROSS-REFERENCE TO RELATED APPLICATIONS

The present application claims the priority of Chinese Patent Application No. 201610513705.2, filed on Jun. 30, 2016, the contents of which are incorporated herein in their entirety by reference.

TECHNICAL FIELD

The present disclosure relates to the field of display technology, and in particular, relates to a heads up display, a heads up display method, and a traveling apparatus.

BACKGROUND

A heads up display, also referred to as a head-up display system, includes a projector 10 which projects an image to be displayed towards a windshield glass 20, such that a driver can clearly see important information without the need of lowering his/her head, as shown in FIG. 1.

At present, information projected by a heads up digital display in a vehicle is mostly presented in green and orange colors, where the colors are relatively monotonous and cannot change. During actual travel, however, environment in the front is constantly changing, and when traveling in different environments, different colors will appear in the driver's field of vision, resulting in different background colors appearing on the heads up display. For example, a display background in a forest is green, and a background color in a desert is dark yellow. Thus, when a color of the environment is the same as or similar to a color of displayed information, it is very difficult for the driver to see the displayed information.

SUMMARY

The present disclosure is intended to address at least one of the technical problems existing in the prior art, and proposes a heads up display, a heads up display method, and a traveling apparatus, so as to enable a driver to always see displayed information clearly in different environments.

In order to address one of the above-described technical problems, the present disclosure provides a heads up display, comprising: a projector, which is configured to project light to a preset region to form a projected image; further comprising:

an environment color acquisition device, which is configured to acquire an environment color of a background region corresponding to the preset region, the background region being an external region observable through the preset region from an observer's position;

a controller, comprising a color control unit, the color control unit being configured to control a color of light projected by the projector according to the environment color, such that a color of the projected image and the environment color are distinguished from each other.

Optionally, the environment color acquisition device is configured to acquire a distribution of environment colors in the background region and determine a coverage area of each environment color in the background region.

Optionally, the color control unit is configured to provide a complementary color of the environment color acquired by the environment color acquisition device to the projector as the color of the projected image.

Optionally, the color control unit is configured to acquire a complementary color of each environment color and provide it to the projector, the projector is configured to form, with respect to the coverage area of each environment color in the background region, the projected image using the complementary color of the environment color within the corresponding coverage area of the environment color.

Optionally, the color control unit comprises:

a storage sub-unit, which is configured to store a preset hue circle an environment hue determination sub-unit, which is configured to determine a first hue in the hue circle corresponding to the environment color acquired by the environment color acquisition device; and a complementary color acquisition sub-unit, which is configured to acquire a second hue at an opposite position to the first hue in the hue circle, and take a color corresponding to the second hue as a complementary color of the environment color.

Optionally, the environment color acquisition device comprises:

an image acquisition unit, which is configured to acquire an environment image of the background region corresponding to the preset region; and a color analysis unit, which is configured to acquire a color distribution of the background region according to the environment image.

Optionally, the environment hue determination sub-unit is configured to compute an average hue of plurality of environment colors having similar hues in the background region, and take the average hue as the first hue, wherein the environment colors having similar hues have an included angle no more than 45° in the hue circle.

Optionally, the environment hue determination sub-unit is configured to compute an average hue of a plurality of environment colors in a predetermined sub-region of the background region, and take the average hue as the first hue.

Optionally, the projector comprises:

a projection source, which is configured to emit light capable of forming the projected image; and a light guiding assembly, which is configured to perform modulation on the light of the projection source, such that the light of the projection source is projected towards the preset region to form the projected image.

Optionally, the projection source comprises a laser projector.

Optionally, the light guiding assembly comprises one or more reflecting mirrors, positions where respective reflecting mirrors are disposed satisfy the following condition: the respective reflecting mirrors are configured to cause light of the projection source to be projected towards the preset region after going through reflection of the respective reflecting mirrors.

Optionally, the heads up display future comprises travel information acquisition unit, the travel information acquisition unit is configured to acquire travel information of a travelling apparatus where the heads up display is placed; and the controller further comprises a content control unit, the content control unit is configured to control a brightness of light projected by the projector according to the travel information, such that image contents of the projected image correspond to the travel information.

Accordingly, the present disclosure further provides a heads up display method, comprising steps of:

S1: acquiring an environment color of a background region corresponding to a preset region, the background region being an external region observable through the preset region from an observer's position; and S2: controlling a color of light projected towards the preset region according to the acquired environment color, such that a color of a projected image formed by the projected light is distinguished from the environment color.

Optionally, the step S1 comprises: acquiring a distribution of environment colors in the background region, and determining a coverage area of each environment color in the background region.

Optionally, the step S2 comprises: acquiring a complementary color of each environment color, and forming, with respect to the coverage area of each environment color in the background region, the projected image using the complementary color of the environment color within a corresponding coverage area of the environment color.

Preferably, the heads up display method further comprises: storing a preset hue circle; and the acquiring the complementary color of the environment color comprises steps of:

S21: determining a first hue in the hue circle corresponding to the acquired environment color; and S22: acquiring a second hue in the hue circle at a position opposite to the first hue, and taking a color corresponding to the second hue as the complementary color of the environment color.

Optionally, the step S21 comprises: computing an average hue of a plurality of environment colors having similar hues in the background region, and taking the average hue as the first hue, wherein the environment colors having similar hues have an included angle no more than 45° in the hue circle.

Optionally, the step S21 comprises: computing an average hue of a plurality of environment colors in a predetermined sub-region of the background region, and taking the average hue as the first hue.

Accordingly, the present disclosure future provides a traveling apparatus, comprising a windshield glass and the above-described heads up display provided by the present disclosure, the preset region being a partial region of the windshield glass.

Preferably, the traveling apparatus comprises any one of a vehicle, a train, an airplane, and a ship.

BRIEF DESCRIPTION OF THE DRAWINGS

The accompanying drawings, which constitute a part of the specification, are provided for further understanding of the present disclosure, and for explaining the present disclosure along with the following specific implementations, but not intended to limit the present disclosure, in which.

DETAILED DESCRIPTION

Specific implementations of the present disclosure will be described in detail below in conjunction with the accompanying drawings. It should be understood that the specific implementations described herein are solely for the purpose of explaining and interpreting the present disclosure rather than limiting the present disclosure.

Figure 1:
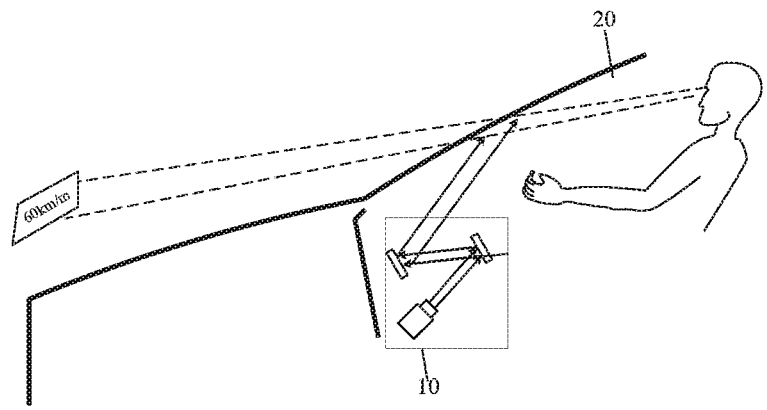
FIG. 1 is a schematic diagram of a structure of a vehicle provided with a heads up display in the prior art.
Figure 2:
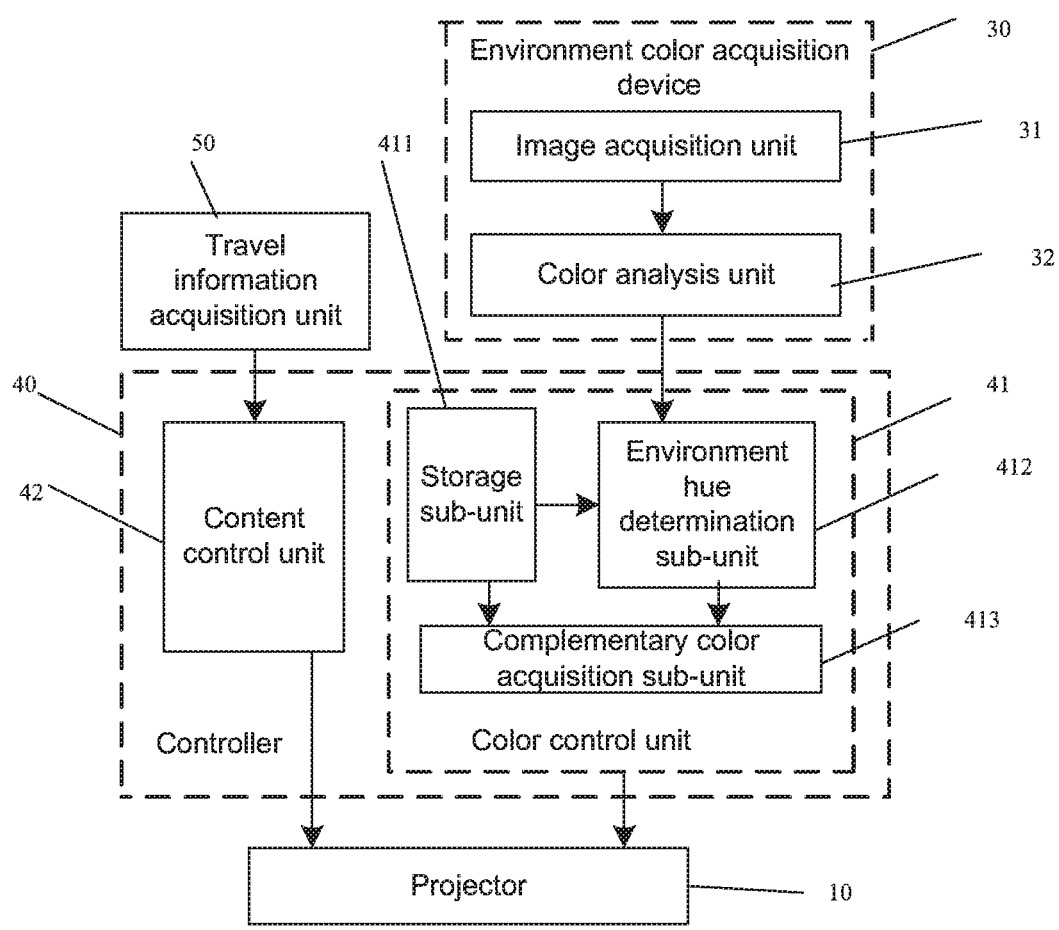
FIG. 2 is a schematic diagram of a modular structure of a heads up display provided by the present disclosure.

As an aspect of the present disclosure, there is provided a heads up display, as shown in FIG. 2, the heads up display includes a projector 10, an environment color acquisition device 30 and a controller 40. The projector 10 is configured to project light to a preset region to form a projected image. The environment color acquisition device 30 is configured to acquire an environment color of a background region corresponding to the preset region. The controller 40 includes a color control unit 41, which is configured to control a color of light projected by the projector according to the environment color, such that a color of the projected image and the environment color are distinguished from each other.

The heads up display may be used on a traveling apparatus such as a vehicle, an airplane, a ship and the like, the preset region may be a part of a windshield glass, and the projected image may be travel information (such as a navigation route, a traveling speed and the like). It is to be noted that the projector 10 may have a projection focal length located ahead of the windshield glass, that is, the projected image may be formed ahead of the traveling apparatus, so that a driver can conveniently observe an actual environment in the front and information on traveling without changing the focal length. It is readily appreciated that when the driver views the projected image, the actual environment in the background region is also viewed at the same time, and the so-called "background region corresponding to the preset region" refers to an external region observable from an observer's position through the preset region.

Compared to the prior art, the projector 10 of the present disclosure can project light whose color can be adjusted according to the environment color of the background region, such that the color of the projected image 10 is different from the environment color, thus preventing a case from happening where a displayed image is undiscernible due to its color being the same as the environment color, thereby ensuring that the driver can always clearly recognize contents of the projected image in different environments.

It is to be noted that, if a plurality of environment colors appear in the background region, "the color of the projected image is different from the environment color" means that the color of the projected image can be distinguished from all of the plurality of environment colors.

Figure 3:
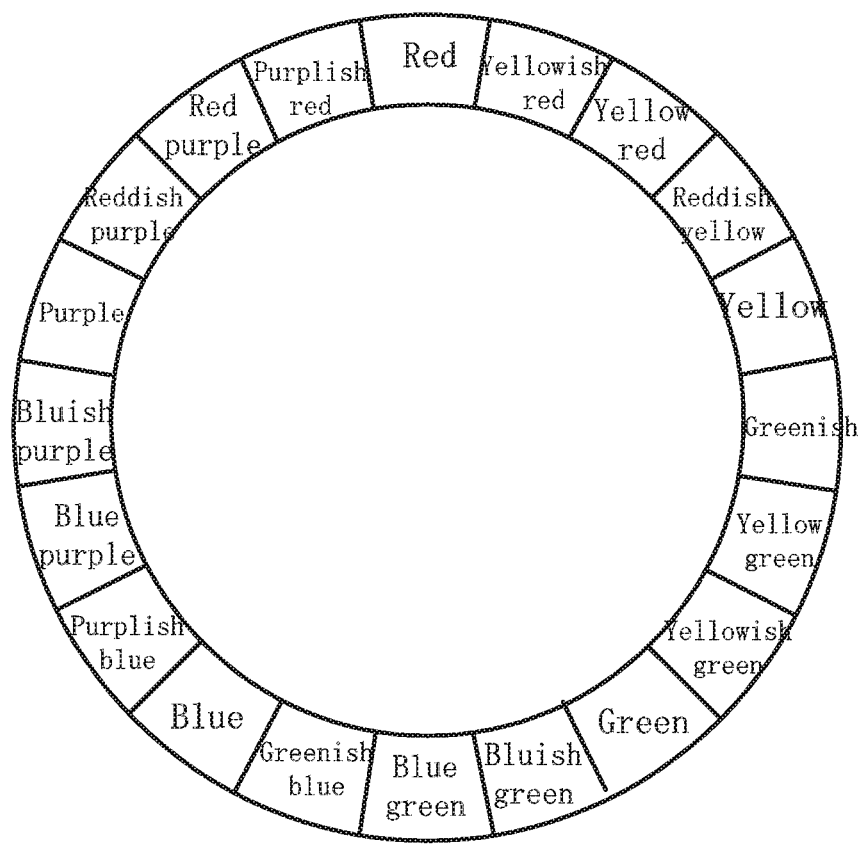
FIG. 3 is a schematic diagram of a color distribution of a hue circle.
Figure 4:
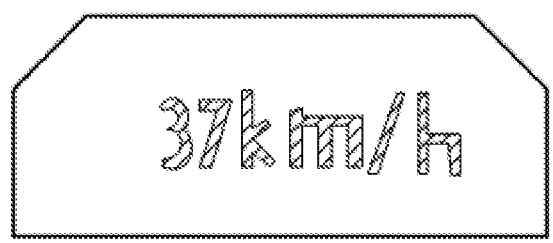
FIG. 4 is a schematic diagram of a first example of a projected image displayed by a heads up display provided by the present disclosure.
Figure 5:
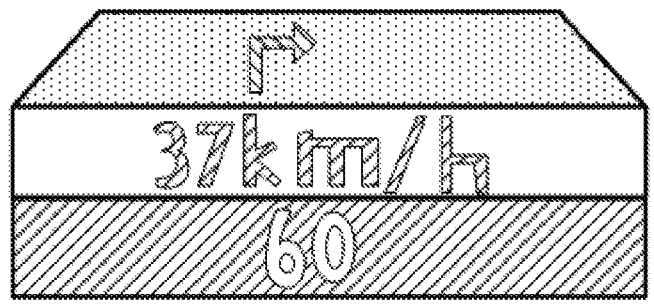
FIG. 5 is a schematic diagram of a second example of a projected image displayed by a heads up display provided by the present disclosure.

In order to enable the driver to see specific contents of the projected image more clearly, the environment color acquisition device 30 is configured to acquire a distribution of environment colors in the background region and determine a coverage area of each of the environment colors in the background region; the color control unit 41 is configured to provide a complementary color of the environment color acquired by the environment color acquisition device to the projector 10 as the color of the projected image. Specifically, the color control unit 41 is configured to acquire a complementary color of each environment color and provide it to the projector, the projector 10 is configured to form, with respect to the coverage area of each environment color in the background region, the projected image using the complementary color of the environment color within the corresponding coverage area of the environment color. It is to be understood that two colors are complementary colors of each other if these two colors form a neutral dark gray color after being mixed, and hues apart from each other by 180° on a hue circle (as shown in FIG. 3) are complementary colors. Complementary colors have important characteristics in that respective colorations of two complementary colors are visually enhanced in degree of saturation if they are closely placed together, with the hues and purities appearing to be strengthened. This is because human eyes demand a physiological equilibrium about coloration, that is, when looking at any one color, always want a corresponding complementary color thereof, and therefore, upon seeing two complementary colors side by side, an edge where the two colors interface with each other introduces complementary colors of each, respectively, thereby visually enhancing colorations of the two colors. Thus, by setting the color of the projected image to be a complementary color of a background color, the driver is enabled to see contents of the image more conveniently and clearly. For example, as shown in FIG. 4, an image content of the projected image may be a traveling speed displayed in a text form (i.e. 37 km/h in the drawing), and when the environment color of the background region is unified red purple, the projected image formed by the projector 10 has a color of green; as shown in FIG. 5, the projected image may include a traveling speed displayed in a text form (i.e. 37 km/h in the drawing), a road speed limit (i.e. 60 in the drawing), and route information (i.e. right turn arrow in the drawing), and when the environment colors of the background region include yellow, red purple and green, a portion of the projected image formed by the projector 10 corresponding to the yellow region (i.e. right turn arrow in the drawing) is blue purple, a portion corresponding to the red purple region (i.e. 37 km/h in the drawing) is green, and a portion corresponding to the green region (i.e. 60 in the drawing) is red purple.

It is to be noted herein that the environment color acquisition device 30 is configured to acquire colors of multiple positions of the background region, and when the colors of the multiple positions are same or similar (for example, falling within an included angle of 45° in the hue circle), the environment color(s) acquired by the environment color acquisition device 30 is considered as one color. In practical applications, environment colors of one type of environment can be seen as one color, and environment colors of different environments with large color differences can be seen as different colors. For example, if the background region is any one of the sky, a desert, a forest, and a road, the environment color is one type; if the background region is any n of the sky, a desert, a forest, and a road, the environment colors are n colors.

As shown in FIG. 2, the environment color acquisition device 30 includes an image acquisition unit 31 and a color analysis unit 32. The image acquisition unit 31 is configured to acquire an environment image of the background region corresponding to the preset region, and specifically, the image acquisition unit 31 may include a separately provided optical image sensor; in a case where the heads up display is applied to a vehicle, the image acquisition unit 31 may also include a photographing portion of a driving recorder. The color analysis unit 32 is configured to acquire a color distribution of the background region according to the environment image, wherein the color analysis unit 32 may determine a color corresponding to each position according to color coordinates of each position in the environment image, and further obtain the color distribution of the background region. Alternatively, the environment color acquisition device 30 may also determine a color corresponding to each position according to a light wavelength of each position in the background region, and further obtain the color distribution of the background region.

As shown in FIG. 2, the color control unit 41 includes a storage sub-unit 411, an environment hue determination sub-unit 412 and a complementary color acquisition sub-unit 413. The storage sub-unit 411 is configured to store a preset hue circle; the environment hue determination sub-unit 412 is configured to determine a corresponding first hue in the hue circle according to the environment color acquired by the environment color acquisition device 30; the complementary color acquisition sub-unit 413 is configured to acquire a second hue at an opposite position to the first hue in the hue circle, and take a color corresponding to the second hue as a complementary color of the environment color, wherein the hue circle stored in the storage sub-unit 411 may be the hue circle as shown in FIG. 3, or may also be another hue circle, such as a twelve-color hue circle, a sixteen-color hue circle and the like. As described above, when colors of multiple positions of the background region are same or similar (for example, falling within an included angle of 45° in the hue circle), the environment color(s) acquired by the environment color acquisition device 30 is considered as one color, and in this case, if there are a large number of hues in the hue circle, then the environment color of the background region may correspond to multiple hues, in which case an average hue of the multiple hues may be taken as the first hue.

Depending on different environments, if division into regions is made absolutely based on similar environment colors, it may result in an interlaced and disorderly distribution of colors in the field of view, that is, different environment colors each cover respective irregularly shaped regions of the field of view. In this case, although the heads up display according to the present disclosure is capable of providing precisely corresponding complementary colors, such projection displaying may not have a good effect in some environments. Thus, in one embodiment of the present disclosure, the preset region is divided into a plurality of regularly-shaped sub-regions in advance (for example, the field of view region is divided into a plurality of bar-shaped sub-regions arranged from the top down, to adapt to objects of different positions such as the sky, trees, the ground and so on.), and an average hue of multiple environment colors in each sub-region is computed by the environment hue determination sub-unit, and then a complementary color used for projection performed on the corresponding sub-region is determined based on the average hue.

Figure 6:
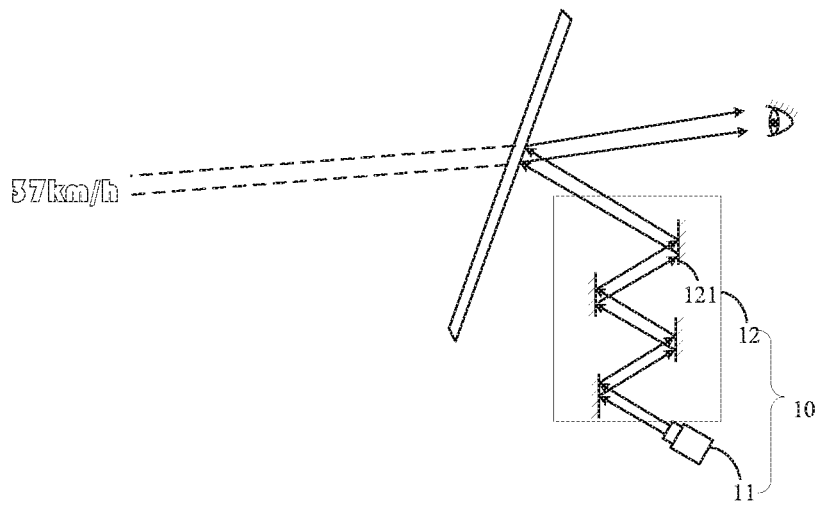
FIG. 6 is a schematic diagram of a structure of a projector of a heads up display provided by the present disclosure.

As shown in FIG. 6, the projector 10 includes a projection source 11 and a light guiding assembly 12, wherein the projection source 11 is configured to emit light capable of forming the projected image; the light guiding assembly 12 is configured to perform modulation on the light of the projection source 11, such that the light of the projection source 11 is projected towards the preset region to form the projected image. It is to be appreciated that among the light emitted by the projection source 11, the color is adjustable for light corresponding to each position of the projected image, that is, the color of each pixel of the formed projected image is adjustable.

To improve display effect, the projection source 11 may include a laser projector, specifically, the laser projector may include a plurality of laser emitters for emitting laser light of different colors, and liquid crystal light valves in one-to-one correspondence with the plurality of laser emitters. The plurality of laser emitters may include red, green and blue laser emitters, and the laser projector further includes a synthesis prism for synthesizing laser light of various colors. The laser light of different colors goes through integration by the synthesis prism after passing the liquid crystal light valves, and then is transmitted through a lens of the laser projector and projected towards the preset region. Pixel colors of the projected image may be adjusted by adjusting light transmittance at respective positions of the liquid crystal light valves.

As shown in FIG. 6, the light guiding assembly 12 includes one or more reflecting mirrors 121, positions where respective reflecting mirrors 121 are disposed satisfy the following condition: the respective reflecting mirrors 121 can cause light of the projection source 11 to be projected towards the preset region via reflection of the respective reflecting mirrors 121.

Further, as shown in FIG. 2, the heads up display further includes travel information acquisition unit 50, which is configured to acquire travel information of the travelling apparatus where the heads up display is placed, the travel information may include a travel speed, and may also include route information and the like. The controller 40 further includes a content control unit 42 connected with the travel information acquisition unit 50 and the projector 10, respectively, the content control unit 42 is configured to control a brightness of light projected by the projector 10 according to the travel information, such that image contents of the projected image correspond to the travel information.

For example, the travel information acquisition unit 50 may acquire an actual traveling speed, a road speed limit, and route information of the travelling apparatus, the content control unit 42, according to the travel information acquired by the travel information acquisition unit 50, controls the projector 10 to adjust contents of the projected image to correspond to the travel information. As explained above, the image contents of the projected image may include a travelling speed in a text form (e.g. 37 km/h in FIG. 5), a road speed limit (e.g. 60 in FIG. 5), and route information (e.g. right turn arrow in FIG. 5).

Figure 7:
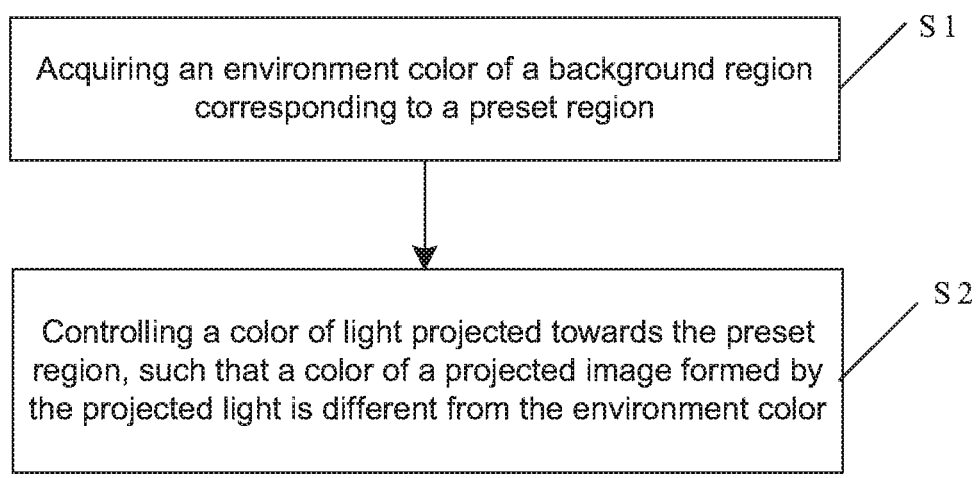
FIG. 7 is a schematic diagram of a display method of a heads up display provided by the present disclosure.

As another aspect of the present disclosure, there is provided a heads up display method, as shown in FIG. 7. The heads up display method includes the following steps S1 and S2.

The step S1 includes acquiring an environment color of a background region corresponding to a preset region.

The step S2 includes controlling a color of light projected towards the preset region according to the acquired environment color, such that a color of a projected image formed by the projected light is distinguished from the environment color.

The step S1 may include acquiring a distribution of the environment color in the background region and determining a coverage area of each environment color in the background region; the step S2 may include providing a complementary color of the environment color acquired by the environment color acquisition device 30 to the projector 10 as the color of the projected image. Specifically, the step S2 may include acquiring a complementary color of each environment color, and then forming, with respect to the coverage area of each environment color in the background region, the projected image using the complementary color of the environment color within the corresponding coverage area of the environment color.

The heads up display method may further include: storing a preset hue circle, and the acquiring a complementary color of each environment color in the step S2 may include the followings steps S21 and S22.

The step S21 includes determining a first hue in the hue circle corresponding to the environment color acquired by the environment color acquisition device;

The step S22 includes acquiring a second hue in the hue circle at a position opposite to the first hue, and taking a color corresponding to the second hue as the complementary color of the environment color.

In one embodiment, the step S21 may include: computing an average hue of a plurality of environment colors having similar hues in the background region, and taking the average hue as the first hue, wherein the environment colors having similar hues have an included angle no more than 45° in the hue circle.

As another implementation, for example, in a case where the background region is divided into a plurality of regularly-shaped sub-regions in advance, the step S21 may include: computing an average hue of a plurality of environment colors in a predetermined sub-region of the background region, and taking the average hue as the first hue.

As another aspect of the present disclosure, there is provided a traveling apparatus, including a windshield glass and the above-described heads up display provided by the present disclosure, and the preset region is a partial region of the windshield glass. Specifically, the traveling apparatus includes but is not limited to any one of a vehicle, a train, an airplane, and a ship.

It can be seen that the projected image displayed by the heads up display of the present disclosure has a changeable color, which is different from the environment color of the background region and is a complementary color of the environment color, as a result, the driver can always see contents of the projected image conveniently and clearly in various environments.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A heads up display, comprising:
   a projector, which is configured to project light to a preset region to display a projected image;
   an environment color acquisition device, which is configured to acquire at least one environment color of a background region corresponding to the preset region, the background region being an external region observable through the preset region from an observer's position; and
   a controller, comprising a color control unit, the color control unit being configured to control a color of light projected by the projector according to the at least one environment color, such that a color of the projected image and the at least one environment color are distinguished from each other, wherein
   when a plurality of environment colors are acquired by the environment color acquisition device, each of the environment colors has a single hue in a hue circle, and the environment color acquisition device is configured to determine a coverage area of each of the plurality of environment colors in the background region, the color control unit is configured to acquire a complementary color of each environment color and provide it to the projector, the projector is configured to display, with respect to the coverage area of each environment color in the background region, the projected image in the complementary color of the environment color within a corresponding coverage area of the environment color, and the color control unit comprises:

a storage sub-unit, configured to store the hue circle, an environment hue determination sub-unit, configured to determine, when environment colors whose hues have an included angle no more than 45° exist in the plurality of environment colors, an average hue of the environment colors whose hues have an included angle no more than 45° in the hue circle as a first hue in the hue circle corresponding to the environment colors whose hues have an included angle no more than 45°, and a complementary color acquisition sub-unit, configured to acquire a second hue at an opposite position to the first hue in the hue circle, and take a color corresponding to the second hue as the complementary color of the environment colors whose hues have an included angle no more than 45°.

2. The heads up display according to claim 1, wherein the environment color acquisition device comprises:

an image acquisition unit, which is configured to acquire an environment image of the background region corresponding to the preset region; and a color analysis unit, which is configured to acquire a color distribution of the background region according to the environment image.

3. The heads up display according to claim 1, wherein the projector comprises:

a projection source, which is configured to emit light capable of displaying the projected image; and a light guiding assembly, which is configured to perform modulation on the light of the projection source, such that the light of the projection source is projected towards the preset region to display the projected image.

4. The heads up display according to claim 3, wherein the projection source comprises a laser projector.

5. The heads up display according to claim 3, wherein the light guiding assembly comprises one or more reflecting mirrors, positions where respective reflecting mirrors are disposed satisfy the following condition: the respective reflecting mirrors are configured to cause light of the projection source to be projected towards the preset region after going through reflection of the respective reflecting mirrors.

6. The heads up display according to claim 1, wherein the heads up display further comprises travel information acquisition unit, the travel information acquisition unit is configured to acquire travel information of a travelling apparatus where the heads up display is placed; and the controller further comprises a content control unit, the content control unit is configured to control a brightness of light projected by the projector according to the travel information, such that image contents of the projected image correspond to the travel information.

7. A traveling apparatus, comprising a windshield glass and the heads up display according to claim 1, the preset region being a partial region of the windshield glass.

8. The traveling apparatus according to claim 7, wherein the traveling apparatus comprises any one of a vehicle, a train, an airplane, and a ship.

9. A heads up display method, comprising steps of:

S1: acquiring at least one environment color of a background region corresponding to a preset region, the background region being an external region observable through the preset region from an observer's position; and S2: controlling a color of light projected towards the preset region according to the acquired at least one environment color, such that a color of a projected image formed by the projected light is distinguished from the at least one environment color, wherein when a plurality of environment colors are acquired, and each of the environment colors has a single hue in a hue circle, the step S2 comprises:

determining a coverage area of each of the environment colors in the background region, acquiring a complementary color of each environment color; and displaying, with respect to the coverage area of each environment color in the background region, the projected image in the complementary color of the environment color within a corresponding coverage area of the environment color;

the heads up display method further comprises: storing the hue circle, the step of acquiring a complementary color comprises:

determining, when environment colors whose hues have an included angle no more than 45° exist in the plurality of environment colors, an average hue of the environment colors whose hues have an included angle no more than 45° in the hue circle as a first hue in the hue circle corresponding to the environment colors whose hues have an included angle no more than 45°, and acquiring a second hue at an opposite position to the first hue in the hue circle, and taking a color corresponding to the second hue as the complementary color of the environment colors whose hues have an included angle no more than 45°.

* * * * *